Jan. 11, 1938.  J. A. RYKACZEWSKI  2,104,909
BRAKE OPERATING MECHANISM
Filed Sept. 4, 1934
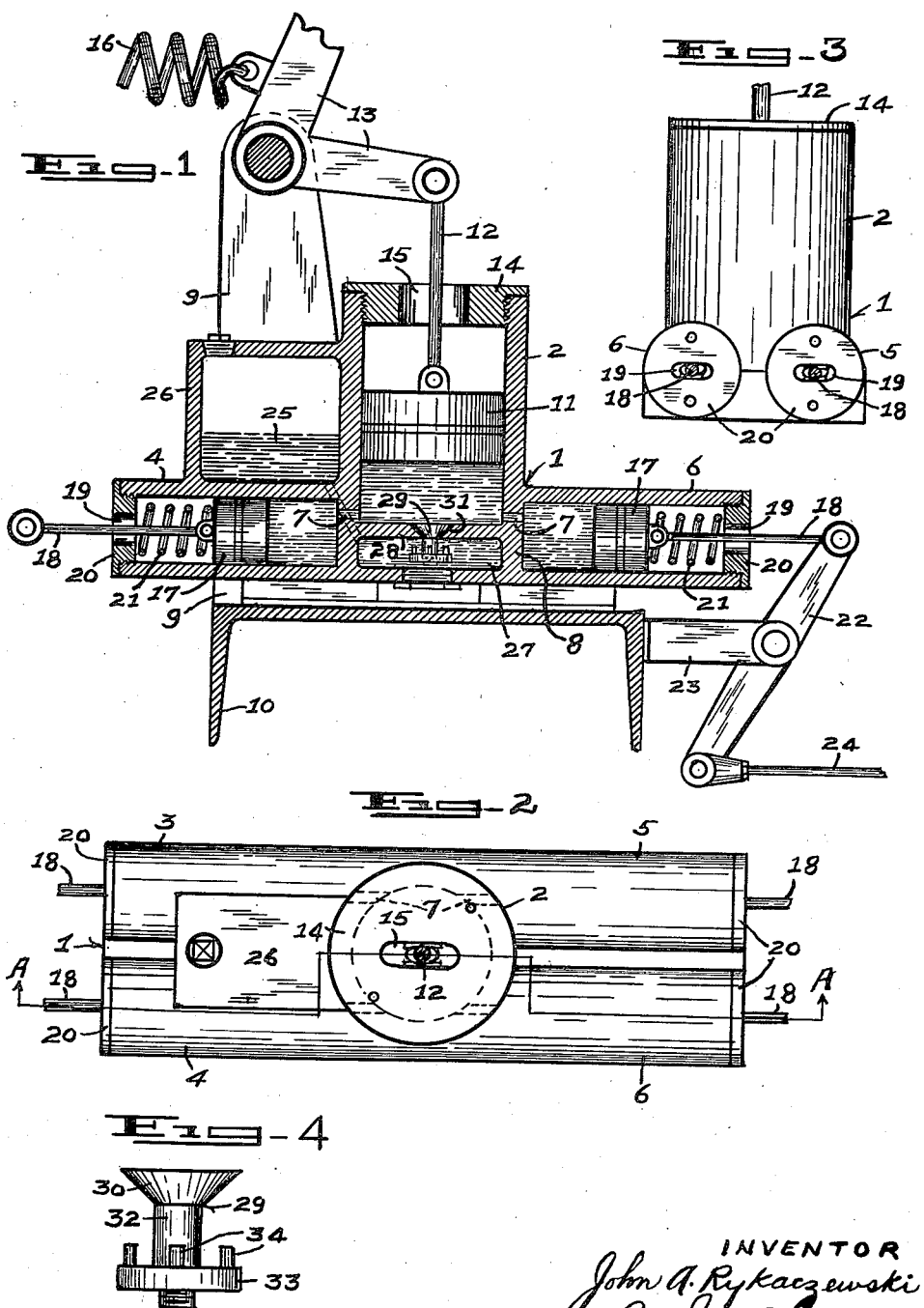
INVENTOR
John A. Rykaczewski
By Jas R Snyder
Attorney Patented Jan. 11, 1938

2,104,909

UNITED STATES PATENT OFFICE 2,104,909

BRAKE OPERATING MECHANISM

John A. Rykaczewski, Braddock, Pa.

Application September 4, 1934, Serial No. 742,524

4 Claims. (Cl. 60—54.5)

My invention relates to a brake operating mechanism for motor vehicles, and important objects thereof are to provide a device of the character described, which is hydraulically operated and assures uniform and equalized braking action, which is embodied in a unitary structure, which embodies relatively few parts, which is simple in its construction and arrangement, durable and efficient in its use, compact, and comparatively inexpensive to manufacture, install, and maintain.

To the accomplishment of these and such other objects as may hereinafter appear, the invention consists of the novel construction, combination and arrangement of parts herein specifically described and illustrated in the accompanying drawing, but it is to be understood that changes in the form, proportions and details of construction may be resorted to that come within the scope of the claims hereunto appended.

In the drawing wherein like numerals of reference designate corresponding parts throughout the several views:

Figure 1 is a vertical cross sectional view of a brake operating mechanism, constructed in accordance with the invention, and taken on line A—A, Figure 2.

Figures 2 and 3 are, respectively, top plan and end views of the device.

Figure 4 is an enlarged side view of the check valve element embodied in the present invention.

In the drawing, for the purposes of illustration, I have disclosed the preferred embodiment of my invention comprising an integrally constructed body portion 1. The latter is formed to provide an operating cylinder 2 and four brake cylinders, respectively indicated at 3, 4, 5 and 6. The operating cylinder is disposed vertically, and the brake cylinders extend horizontally and are joined with the lower end of the former. The brake cylinders 3 and 4 project forwardly from the operating cylinder, and the brake cylinders 5 and 6 project rearwardly from the latter, whereby the operating cylinder is disposed intermediate of the adjacent ends of the forwardly projecting brake cylinders 3 and 4 and of the rearwardly projecting brake cylinders 5 and 6.

The brake cylinder 3 is longitudinally aligned with the brake cylinder 5, and the brake cylinder 4 is similarly aligned with respect to the brake cylinder 6. All of the brake cylinders are disposed on the same horizontal plane, and the brake cylinders 3 and 5 are disposed parallel relatively to the brake cylinders 4 and 6. The inner adjacent ends of the operating and brake cylinders communicate with each other through respective ports 7, which are formed in the partition wall 8 separating the brake cylinders from the operating cylinder.

The body portion 1 is rigidly fixed in position by a supporting bracket 9, which is secured to a frame member 10 of the motor vehicle chassis. It is obvious, however, that the device may be attached to the motor vehicle in any other suitable manner to best meet conditions found in practice.

A piston 11 is slidably mounted in the operating cylinder 2 and pivotally connected with the inner end of a piston rod 12. The outer end of the piston rod is pivotally joined with a brake lever 13, which latter is pivotally attached with the supporting bracket 9. A cylinder head 14 is threadedly engaged in the outer end of the operating cylinder and provided with an oblong slot 15 for the passage of the piston rod and for permitting the necessary angular movement of the latter during the operation of the device. A spring 16, suitably joined with the vehicle chassis and with the brake lever 13, normally functions to return the latter to the outer inoperative position, whereby the piston is drawn to its outer inoperative position within the operating cylinder.

A plunger 17 is slidably mounted in each of the brake cylinders 3, 4, 5 and 6 and pivotally connected with the inner end of a plunger rod 18. The latter projects through an oblong compensating slot 19 formed in the cylinder head 20, which is threadedly engaged in the outer end of respective brake cylinders. Springs 21 are carried on the plunger rods within the brake cylinders and normally function to force the plungers to their inner inoperative positions within respective brake cylinders.

The outer end of each plunger rod 18 is pivotally connected with one end of a cross-arm 22, which is suitably mounted for oscillatory movement on a support 23 suitably fixed to the vehicle chassis. The other end of the cross-arm is pivotally joined with a pull rod 24, which extends to and joins with the braking mechanism at the wheel of the vehicle in the usual manner of mechanically operated braking devices.

Operating fluid 25, of any suitable character, is carried in the operating cylinder inwardly of the piston 11 and in the brake cylinders 3, 4, 5 and 6 inwardly of their respective plungers 17. The inward movement of the piston in the operating cylinder 2 will force the fluid through the partition wall ports 7 into the brake cylinders, whereby the plungers 17 will be forced outwardly in the latter to actuate the cross-arms 22 and pull rods 24 to effect the braking operation. The retraction or outward movement of the piston will draw the fluid from the brake cylinders, thereby allowing the plungers to shift to their inner inoperative positions to release the braking action of the device.

The body portion 1 includes a fluid storage reservoir 26, which communicates with a well 27 formed and disposed directly under the bottom 28 of the vertically extending operating cylinder 2.

A check valve 29 is mounted in the operating cylinder bottom 28 and functions automatically to permit the intake of additional operating fluid into the operating cylinder 2 when required. The check valve comprises a tapered valve head 30 which seats in a correspondingly shaped port 31 in the cylinder bottom 28. The valve head is provided with a valve stem 32 depending into the well 27. The lower end of the valve stem carries a threadedly engaged collar 33, which is provided on its top with upright stop pins 34 to prevent the sealing of the bottom port 31 when the check valve is actuated to allow the passage of additional fluid from the fell 27 to the operating cylinder 2 by the operation of the piston 11 in the latter.

The feature of the present invention resides in the provision of an integrally formed operating mechanism for the purpose set forth, wherein the brake cylinders extend at right angles with respect to the associated operating cylinder and in the direction to adapt same for convenient connection with the mechanical brake elements of the vehicle. Each of the brake cylinders with its plunger and rod has its own, separate and individual connecting elements with the respective brake mechanism at each wheel of the motor vehicle. As the braking operation of one wheel is entirely independent of any of the other wheels, the braking operation is perfectly equalized, even if the wheel brakes are not uniformly adjusted, for the uniform pressure in each of the braking cylinders will shift the various plungers a greater or less distance and thereby equalize the braking action of the device.

The present invention provides a simple, durable and most efficient device of its kind, which is conveniently operable to effect an equalized and uniform braking action regardless of the relative adjustment of the individual braking elements at the wheels of the motor vehicle.

What I claim is:

1. In combination, a hydraulic operating mechanism for motor vehicle brakes comprising, an integrally formed body portion constructed to provide a vertically disposed operating cylinder and two pairs of horizontally disposed brake cylinders, said pairs of brake cylinders being longitudinally aligned relatively to each other, each of said brake cylinders having a separate port to provide communication between same and said operating cylinder, said body portion embodying a fluid storage reservoir including a well disposed directly under the bottom of said operating cylinder, and an automatically operable check valve mounted in the bottom of said operating cylinder.

2. In combination, a hydraulic operating mechanism for motor vehicle brakes comprising, a body portion formed to provide a vertically disposed operating cylinder and two pairs of brake cylinders, said pairs of brake cylinders being disposed horizontally and longitudinally aligned relatively to each other, said body portion embodying a fluid storage reservoir including a well disposed directly under said operating cylinder and an automatically operable check valve mounted in the bottom of said operating cylinder.

3. In combination, a hydraulic operating mechanism for motor vehicle brakes comprising, an integrally formed body portion constructed to provide a vertically extending operating cylinder and two pairs of brake cylinders, said pairs of brake cylinders being longitudinally aligned relatively to each other and being joined with and projecting in opposed directions from the lower end of said operating cylinder, each of said brake cylinders having a separate port providing communication between the same and said operating cylinder, said body portion embodying a fluid storage reservoir including a well disposed directly under the bottom of said operating cylinder, and an automatically operable check valve mounted in the bottom of said operating cylinder.

4. In combination, a hydraulically operable mechanism for motor vehicle brakes comprising a body portion constructed to provide an operating cylinder and two pairs of intercommunicating brake cylinders, said pairs of brake cylinders being longitudinally aligned relatively to each other, said body portion including a fluid storage reservoir including a well disposed directly under the bottom of said operating cylinder, and an automatically operable check valve mounted in the bottom of said operating cylinder.

JOHN A. RYKACZEWSKI.